United States Patent [19]
Harris

[11] Patent Number: 5,896,672
[45] Date of Patent: Apr. 27, 1999

[54] PRECISION SHAFT ALIGNMENT SYSTEM

[76] Inventor: G. Danny Harris, 1729 Shopes Creek Rd., Ashland, Ky. 41102

[21] Appl. No.: 08/884,528

[22] Filed: Jun. 27, 1997

[51] Int. Cl.$^6$ .............................. G01B 5/25; G01B 11/27
[52] U.S. Cl. ................................ 33/645; 33/286; 33/412; 33/533; 33/529
[58] Field of Search ........................... 33/645, 533, 520, 33/529, 613, DIG. 21, 412, 286

[56] References Cited

U.S. PATENT DOCUMENTS

| | | |
|---|---|---|
| 4,367,594 | 1/1983 | Murray, Jr. . |
| 4,553,335 | 11/1985 | Woyton . |
| 4,928,401 | 5/1990 | Murray, Jr. ................................ 33/645 |
| 5,056,237 | 10/1991 | Saunders .................................... 33/645 |
| 5,371,953 | 12/1994 | Nower et al. .............................. 33/645 |
| 5,435,073 | 7/1995 | Sullivan .................................... 33/661 |
| 5,508,609 | 4/1996 | Parkinson et al. ................. 324/207.25 |

Primary Examiner—Christopher W. Fulton
Attorney, Agent, or Firm—Goldstein & Canino

[57] ABSTRACT

A portable and or modular alignment system for establishing the proper axial alignment of a first rotatably mounted shaft, and a second opposed, rotatably mounted shaft. The first shaft extending from a first unit, while second shaft extends from a second unit. The axial alignment of the first shaft with the second shaft is achieved by adjusting the relative horizontal and vertical position of the first unit with respect to the second unit, where the second shaft may be assumed to be fixed in position. The alignment system comprises a control and computing unit for receiving alignment information indicative of vertical and horizontal position changes to be provided to align the first shaft with the second shaft. Changes in the vertical position are provided by a plurality of vertical actuator units, while changes in the horizontal position are provided by a plurality of horizontal actuator units. Each of the vertical actuator units and horizontal actuator units is responsive to the control and computing unit to enable the altering and adjustment of the alignment of the first shaft with respect to the second shaft to establish the desired axial alignment.

16 Claims, 6 Drawing Sheets

PRECISION SHAFT ALIGNMENT SYSTEM

BACKGROUND OF THE INVENTION

1. Field Of The Invention

The invention relates to alignment apparatus, and more particularly, to a system for establishing the axial alignment of a first rotatably mounted shaft (extending from a first unit) with respect to a second rotatably mounted shaft extending from a second unit, where the shafts are arranged in an end-to-end orientation.

2. Background And Objects Of The Invention

There is a known need in the art to properly align the shaft of a first torque producing unit with the shaft of a second loading (component) unit. The desired axial alignment, if true and precise, provides for the high efficiency coupling of torque from the first unit to the second unit. Often the shafts are associated with respective rotating members of the each unit. The misalignment of the shafts may provide an angular alignment error where the center-lines of the two shafts intersect at an angle, or may be manifested by a parallel offset misalignment error where the respective shafts are parallel but exhibit an axial offset with the center-lines of each shaft not concentrically or coaxially aligned. Of course, a combination of angular and parallel offset misalignments are certainly possible. If the units are not properly aligned, where the respective shafts are not axially aligned along a common center-line or axis, the result may be damage to various components including items such as bearings, seals, gears, couplings, and the like. In addition, energy lost via friction and "vibration" may be conserved with proper axial alignment and delivered to the load.

A variety of "alignment fixtures" are known in the art to assist in the accurate alignment (or alignment verification) of coupled or uncoupled (but soon to be coupled) shafts. For example, an apparatus which may be employed to determine the alignment accuracy of two shafts is provided by U.S. pat. No. 4,553,335 to Woyton. The Woyton apparatus provides for readings (alignment information) to be provided either by well known means such as dial indicators or linear variable differential transformer (LVDT) transducers, which are particularly useful for providing alignment information to a calculating or computing device to determine the amount of "shimming" which is required to properly axially align the respective shafts. Another known device, as provided by U.S. Pat. No. 5.056,237 to Saunders, may be employed with either coupled or uncoupled shafts to determine the alignment status thereof. The Saunders invention is arrangable for providing electronic alignment information (as well as dial indications). However, with each of the above alignment arrangements, and others available in the art, there exists a need to manually adjust the height of one or more units being aligned by using shims, and the like. In addition, many commonly employed alignment means and methods require relatively large amounts of time to produce a satisfactory alignment result.

Common shaft alignment methods are well know to skilled persons. For example, one commonly used method for determining alignment information, and one which is contemplated for use by Woyton and Saunders, is the well known "reverse indicator" or "reverse alignment" method. The reverse alignment process involves collecting alignment information at four (specific) locations having a 90 degree rotational displacement, as well known to said skilled persons. Again, these methods are generally employed to gather and determine the amount of shimming or spacing necessary to align a first shaft with respect to a second coupled, or to be coupled, shaft.

The advent of low cost computing and control components, including but not limited to microprocessors, microcontrollers, programmable logic controllers (PLCs) and programmable logic devices, has resulted in many computer based systems being designed for a large variety of functions and applications. These systems, which are often termed embedded (computer) systems, provide for the full or partial automation of many known processes or procedures, which have in the past been carried out manually or in a non-automated manner. For example, there is a need in the art for an improved alignment system which will support the automated and rapid alignment of a first shaft with respect to a second (possibly loading) shaft. Such systems may be designed using many known off-the-shelf components that may be applied to "automate" and or simplify many manually conducted alignment methods, which are presently employed in the art.

Objects of the present invention are, therefore, to provide new and improved precision shaft alignment systems having one or more of the following capabilities, features, and/or characteristics:

- enables quick and easy axial alignment of two rotatably mounted opposed shafts;
- computer controlled manual (via operator input) or automated axial alignment processes supported;
- portable system;
- modular, simple, and flexible system architecture;
- significantly reduces the setup, calibration and alignment times typically required (when compared to many known alignment systems);
- very simple methods to realize precision alignment;
- includes low profile vertical actuator unit assemblies and embodiments;
- employs many common off-the-shelf components and devices.

The above listed objects, advantages, and associated novel features of the present invention, as well as others, will become more clear from the description and figures provided herein. Attention is called to the fact, however, that the drawings are illustrative only. Variations are contemplated as being part of the invention, limited only by the scope of the appended claims.

SUMMARY OF THE INVENTION

In accordance with the invention, a precision shaft alignment system for establishing the proper axial alignment of a first rotatably mounted shaft, and a second opposed, rotatably mounted shaft is provided. The first shaft extends from a first unit, while second shaft extends from a second unit. The axial alignment of the first shaft with the second shaft is rapidly achieved by adjusting the relative horizontal and vertical position of the first unit with respect to the second unit, where the second unit may be assumed to be fixed in position. The alignment system comprises a control and computing unit for receiving alignment information indicative of vertical and horizontal position changes required to align the first shaft with the second shaft, and a plurality of vertical actuator units. Each vertical actuator unit is responsive to the control and computing unit, and positionable at a suitable location about a mounting plate of the first unit to enable the adjustment of the vertical position and alignment of the first shaft, with respect to the second shaft. Also included are a plurality of horizontal actuator units, each arranged to enable the adjustment of the horizontal (side-to-side) position of the first unit with respect to the second unit in order to establish the required horizontal alignment (of the shafts). As with the vertical actuator units, each horizontal actuator unit is also responsive to the control and computing unit. Accordingly, if the control and computing unit receives suitable alignment information, the vertical and horizontal actuators may be utilized to adjust the vertical and horizontal position of the first unit (and shaft) to achieve the desired axial alignment.

The alignment information is ascertained via an alignment fixture, which may include a plurality of precision measuring devices arranged to support a reverse alignment process or method. The reverse alignment process, which is known in the art, provides a plurality of readings (or distance values/numbers) representing alignment information, which is communicated to the control and computing unit. The alignment information is then applied or employed to determine the appropriate respective vertical position adjustments required by one or more of the vertical actuators, and the appropriate respective horizontal position adjustments required by one or more of the horizontal actuators. A plurality of precision measuring modules, each operatively coupled to a respective vertical actuator, are provided to determine a change in the vertical position as the vertical position is adjusted at the associated location about the mounting plate. This measured change may then be communicated to the control and computing unit, and applied as required. For example, the control and computing unit may be arranged to respond to the measured change, as determined by each precision measuring module, by maintaining simultaneous 'harmony' of the vertical actuators when raising or lowering the first unit by compensating for any movement variance. Movement variance is compensated for (i.e., minimized or eliminated) by momentarily stopping or slowing one or more vertical actuators, as required.

It is further contemplated that the control and computing unit includes a user interface comprised of switch means, a display module, an audio module, and possibly other required interface components, which enable the exchange of information between an operator and the control and computing unit, as required, to produce the proper axial alignment of the first and second shafts.

BRIEF DESCRIPTION OF THE DRAWINGS

In the drawings, like elements are depicted by like reference numerals. The drawings are briefly described as follows.

LIST OF REFERENCE NUMERALS USED IN THE DRAWINGS

10—alignment system
10a—alignment system (second embodiment)
12—first unit
12a—first shaft (of first unit)
16—second unit
16a—second shaft (of second unit)
20—vert. actuator units (generally or non-specifically)
20a—(first) vertical actuator unit
20b—(second) vertical actuator unit
20c—(third) vertical actuator unit
20d—(forth) vertical actuator unit
21—vertical actuator units (alternate embodiment)
22—mounting means
24—horiz. actuator units (general or non-specifically)
24a—(first) horizontal actuator unit
24b—(second) horizontal actuator unit
24c—(third) horizontal actuator unit
26a—vertical actuating element
26b—horizontal actuating element
30—control and computing unit
34a—first mounting base
34b—second mounting base
35a—support base (gull wing shape)
40—alignment fixture
42—precision measuring module
44a—first coupling hub
44b—second coupling hub
45—mounting bracket
46a—(first) precision measuring device
46b—(second) precision measuring device
48—injection shim material
50—fixed support member (of vertical actuator unit)
52—lifting member
54—actuation assembly
60—control panel (user interface)
60a—switches/keypad (switch means)
60b—display means
60c—audio output unit

DETAILED DESCRIPTION OF THE PREFERRED EMBODIMENTS

It is important to establish the definition of several important terms that will be used throughout this disclosure. The term 'axially aligned' and 'properly aligned' may be considered synonymous with the axial alignment (i.e., along a single axis) of a first shaft with a second, opposed shaft, as depicted in, for example, FIGS. 1, 2, and 4A. The expression "dynamically stable mechanical coupling" will be defined as a condition that results, if the first and second shaft are properly aligned, coupled, and rotated at a required speed (e.g., RPM), wherein there is a minimal or acceptable level of vibration generated as the shafts rotate. Also, the terms proper alignment and precision alignment may be assumed to be synonymous and equivalent. It should also be understood that references to changes in, or the adjustment of, the horizontal and or vertical position of the first unit, with respect to the second unit, may result in changes in the angular alignment of the respective shafts thereof, as well as the parallel offset of the shafts. Regardless, the adjustment of the horizontal and vertical positions is always intended to result (eventually) in the proper axial alignment of the shafts. Finally, the term 'footprint', as applied to a mounting plate or mounting means of a unit, such as a motor or pump, is intended to indicate the outline or perimeter, and the area contained therein, as established by said mounting plate or means. As another example, the term footprint may be applied to a piece of equipment to indicate or convey the area of a mounting surface required for the piece of equipment to be placed and fixed at a particular location.

Figure 1:
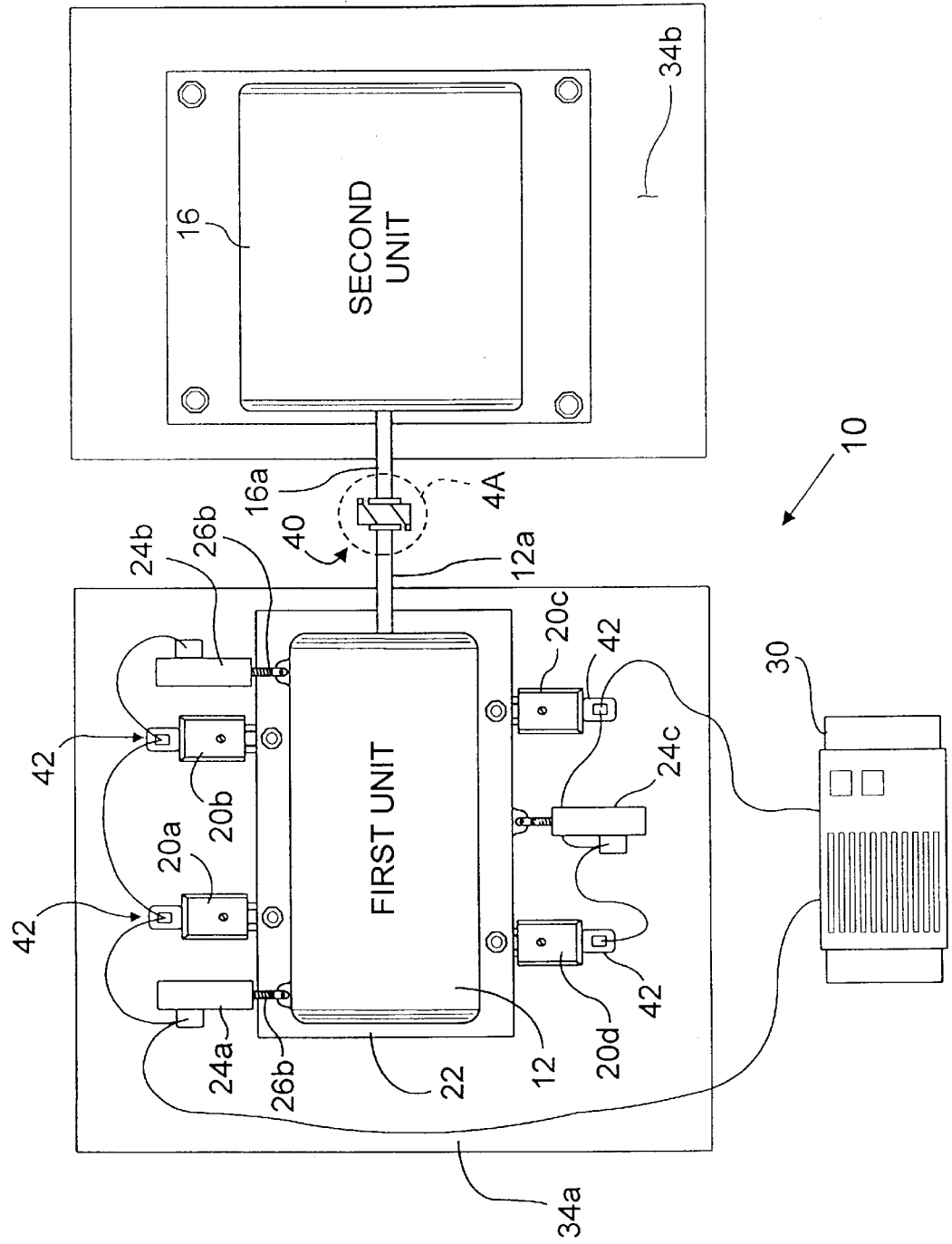
FIG. 1 is a plan view of an embodiment of the alignment system of the present invention placed in position for use in an alignment process.

Referring now to FIG. 1, there is depicted a plan view of an alignment system 10, arranged to adjust the vertical position and horizontal position, as required, of a first unit 12 with respect to a second unit 16. The first unit 12 includes a first shaft 12a, which is rotatably mounted and extends outwardly from the first unit 12 and toward the second unit 16. The second unit 16 includes a second shaft 16a, which is rotatably mounted and extends outwardly from the second unit 16 (toward the first unit 12). Typically, the distal ends of each shaft will be positioned in a proximal position, end-to-end, opposed, and spaced as shown, for example, in FIG. 1. The alignment system 10 of the present invention is arrangable to axially align a first shaft 12a with a second shaft 16a to enable the mechanical coupling therebetween to result in a dynamically stable coupling of the first shaft 12a to the second shaft 16a. It should be noted that at some previous time (possibly immediately before the alignment process is started) the position of the second unit 16 is established at an appropriate height (and alignment) and the second unit is mounted or suitably fixed to a second mounting base 34b.

FIG. 1 also provides a plurality of vertical actuator units 20a, 20b, 20c, and 20d, as depicted. For simplicity, the reference numeral 20 will be utilized when referring to any single vertical actuator unit (in a general fashion), or the group of vertical actuator units collectively. When it is necessary to refer to a specific vertical actuator unit 20, the specific reference numeral will be used. For example, to place focus on the upper left vertical actuator unit, as shown in FIG. 1, the reference numeral 20a will be used. As illustrated in FIG. 1, each vertical actuator unit 20 may be positionable at a suitable location about a footprint established by a mounting means 22. The mounting means 22 would typically be provided, for example, by a mounting plate, or the like, fixed to the first unit 12. Each respective vertical actuator unit 20 is configured to enable the adjustment of the vertical position of the associated location (about the footprint) wherein the particular vertical actuator unit 20 is located. As an example, if the distal end (i.e., the end farthest from the second unit) of the first unit 12 must be raised, the vertical actuator units 20a and 20d would be employed (or actuated) to raise the distal end of the first unit 12. As can be further seen, the vertical actuator units 20 are operatively coupled to a control and computing unit 30, so that each vertical actuator unit 20 may be individually actuated by the control and computing unit 30, for example, through an electronic, hydraulic, or pneumatic interface means, to increase or decrease the height of the associated location of the first unit 12 above a mounting base 34a. Subsequently, when all adjustments are complete, the first unit 12 will typically be mounted or fixed in the established position to maintain the proper alignment. It may be noted that the first mounting base 34a and the second mounting base 34b, may be termed 'sole plates' or 'slabs', and may be provided as shown, comprised of two distinct and spaced mounting bases, or as a single mounting base (not shown).

Further depicted in FIG. 1 are a plurality of horizontal actuator units 24a, 24b, and 24c, which are included to enable the horizontal adjustment of the position of the first unit 12 with respect to the second unit 16, thereby enabling the horizontal alignment of the first shaft 12a with respect to the second shaft 16a. Again, as with the vertical actuator units 20, for simplicity, the reference numeral 24 will be employed when referring to any single horizontal actuator unit (generally), or the group of horizontal actuator units 24. When it is necessary to refer to a specific horizontal actuator unit, the specific reference numeral will be used. As will be addressed in greater detail below, the vertical actuator units 20 and the horizontal actuator units 24 are operatively coupled and responsive to the control and computing unit 30. Accordingly, once any required alignment information has been communicated to the control and computing unit 30, any and all (as required) of the vertical actuator units 20 and horizontal actuator units 24 may be actuated to establish the proper axial alignment of the first shaft 12a with respect to the second shaft 16a. As depicted in FIG. 1, the horizontal actuator units 24 are removably fixed to the first base 34a, with the actuator element 26b removably coupled to the first unit 12. Also, although the embodiment of FIG. 1 includes three horizontal actuator units 24a, 24b, and 24c, it is contemplated that embodiments of the present invention may be configured with fewer or more horizontal actuator units 24 while providing the equivalent functionality.

Figure 2:
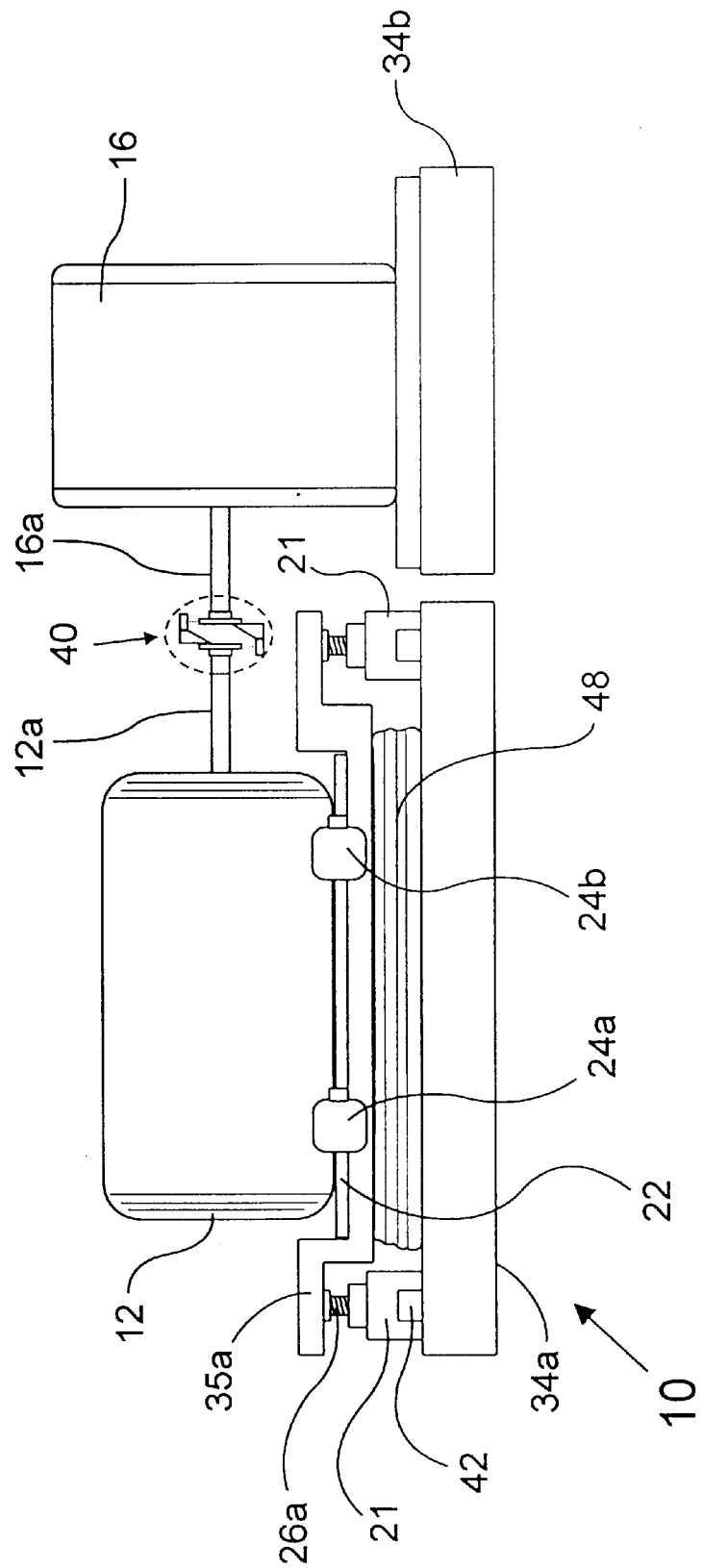
FIG. 2 depicts a side view of a second embodiment of the invention.

As can be seen in FIGS. 1 and 2, an alignment fixture 40, which is an example of an 'alignment information determining means', is provided (as shown, or in other known forms) with the alignment system 10 or 10a, respectively. The alignment fixture 40 enables the operator to determine alignment information for use in establishing the required axial alignment of the first shaft 12a and the second shaft 16a. For example, the particular alignment fixture 40 depicted may be employed to implement a 'reverse alignment process' involving the determining of four readings (obtained at locations that are 90 degrees apart). The alignment information ascertained therefrom, would typically be communicated to the control and computing unit 30, and applied or employed, resulting in the subsequent automated and rapid axial alignment of the first shaft 12a with respect to the second shaft 16a. An example of a 'reverse alignment' type alignment fixture 40, as contemplated for use with the present invention, as depicted in FIGS. 1 and 2, will be addressed more fully when referring to FIGS. 4A, 4B, and 4C.

Figure 3A:
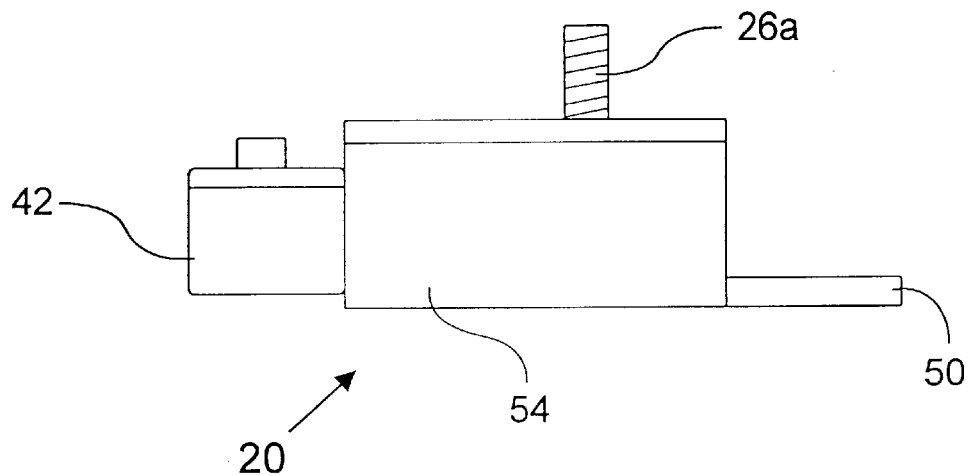
FIGS. 3A and 3B illustrated a side and a top view, respectively of a preferred embodiment of a vertical actuator unit that may be employed with the alignment system disclosed herein.
Figure 3B:
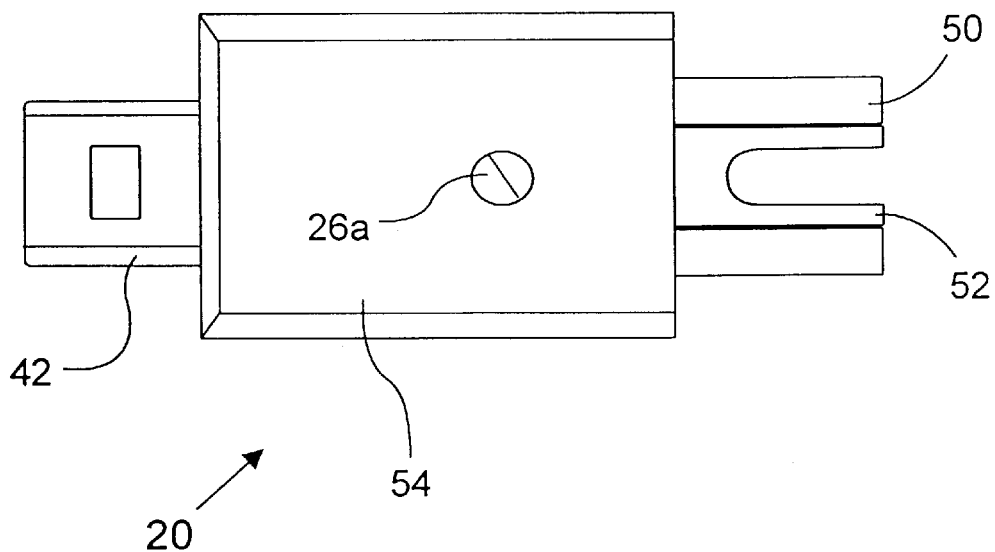

As best seen in FIGS. 3A and 3B, the embodiment of the alignment system 10 of FIG. 1 may employ a low-clearance vertical actuator unit 20. The low-clearance characteristic ensures the (vertical) offset or lift of the first unit 12 above the plane or surface of the first mounting base 34a, as required to enable the vertical actuator units 20 to be properly positioned to lift (or lower) the first unit 12, may be kept to a minimum. The vertical actuator unit 20 may be comprised of a actuation assembly 54 that will typically include a housing (not specifically shown), at least one fixed support member 50 extending radially away from the actuation assembly 54, and at least one lifting member 52, also extending radially away from the actuation assembly 54, as shown. The actuation assembly 54 may include a vertical actuating element 26a, which as shown, may be provided by a screw-type driving element or member. Also, contemplated as included within the actuation assembly 54 may be an electric driving motor, mechanically coupled, possibly via a gear reducing means, to the vertical actuating element 26a (both the electric motor and gear deducing means not shown). The specific structure required to provide the actuation assembly 54 is known in the art. Precision measuring modules 42 may also be included with the alignment system 10, with each operatively coupled to a respective vertical actuator unit 20 to determine the magnitude of resulting changes that have occurred in the vertical position (possibly including determinations of, or corrections for 'sag' or 'soft foot' that may result in a reverse alignment process). The precision measuring modules, which may be comprised of encoder type devices or the like, may be configured and employed by skilled persons to enable the monitoring and verification of vertical position changes resulting from the operation of respective vertical actuator units 20 of the present invention. Specifically, the monitored (measured) change may then be communicated to the control and computing unit, and applied as required, to maintain simultaneous harmony of the vertical actuators when raising or lowering the first unit by compensating for any movement variance detected. The variance compensated and or eliminated by momentarily stopping one or more vertical actuators. It should be noted that the vertical clearances required to accommodate the vertical actuator units 20 will, generally, be proportional to the size and weight of the actual first unit 12 that must be lifted and properly positioned.

Turning now to FIG. 2, there is provided a side view of an alternate embodiment of the alignment system of the present invention. One distinguishing feature of this embodiment is the use of a modified "gull wing" style support base 35a, which may or may include or be equivalent of the first unit mounting means 22 (e.g., mounting plate) of FIG. 1. The gull wing support base 35a enables vertical actuator units 21 to be employed. As can be seen in FIG. 2, the low-clearance requirement of the vertical actuator units 20 is significantly reduced by the use of the support base 35a enabling the use of the vertical actuator units 21. As with the embodiment of FIG. 1, a plurality of vertical actuator units 21 are required to properly axially align the first shaft 12a with the second shaft 16a. In a preferred embodiment of the invention, a total of three or four vertical actuator units 20 or 21 would be employed, wherein each is individually actuatable by the control and computing unit 30. An alternate arrangement for the mounting and mechanical coupling of the horizontal actuator units 24a and 24b is also provided in FIG. 2. This arrangement may provide for the removable mounting of the horizontal actuation element 26b on the first unit mounting means 22 (as depicted), which may be slidably placed on the support base 35a. Those skilled in the art will appreciate the variety of mechanical arrangements which may be employed with the embodiment of FIG. 2 to realize the support base 35a, mounting means 22, and the vertical actuator units 21. As such variations are contemplated as being within the scope of the present invention when provided to support the automated (either automatic or remotely controlled manual) adjustment in the vertical and horizontal position of the first unit 12 to establish the proper axial alignment of the first shaft 12a with respect to the second shaft 16a. Also shown in FIG. 2 is a portion of injection shim material 48, which is sandwiched in between the support base 35a and the first mounting base 34a, to fill the space therein to support the weight of the first unit 12 and maintain the proper axial alignment of the first shaft 12a and the second shaft 16a. It should be understood that a variety of 'shimming materials' are known in the art, and any and all may be considered appropriate for use with the present invention.

As can be seen in FIGS. 1 and 2, the alignment system of the present invention is contemplated as a modular and portable system, which may be easily installed and operated to achieve the proper shaft alignment, and subsequently uninstalled and removed and be later used for other alignment tasks. In addition, although not specifically shown in the figures, the present system may be embodied to be fully or partially deployed, in a continuous fashion, to enable the monitoring or verifying (as needed) of the alignment of the first shaft 12a and the second shaft 16a. As such, for example, the vertical and or horizontal actuator units may be installed (possibly permanently) as shown in FIGS. 1 and 2, or in similar or equivalent positions, as may be provided by skilled persons, to minimize the setup time needed for said monitoring or verifying.

Figure 4A:
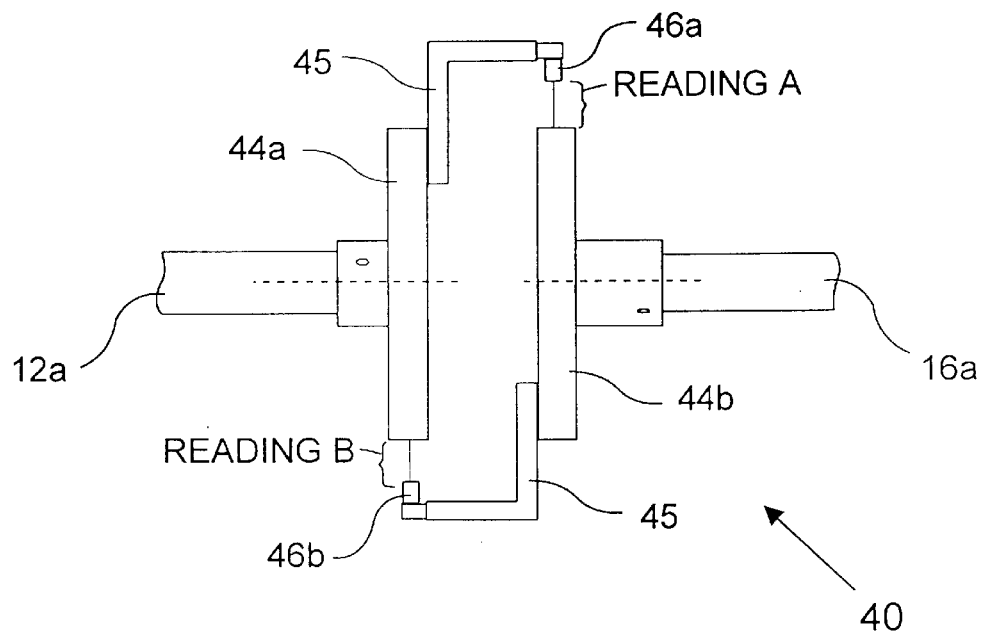
FIGS. 4A, 4B, and 4C provide side views of one possible embodiment of a 'reverse alignment' alignment fixture arrangement employing a plurality of precision measuring devices.
Figure 4B:
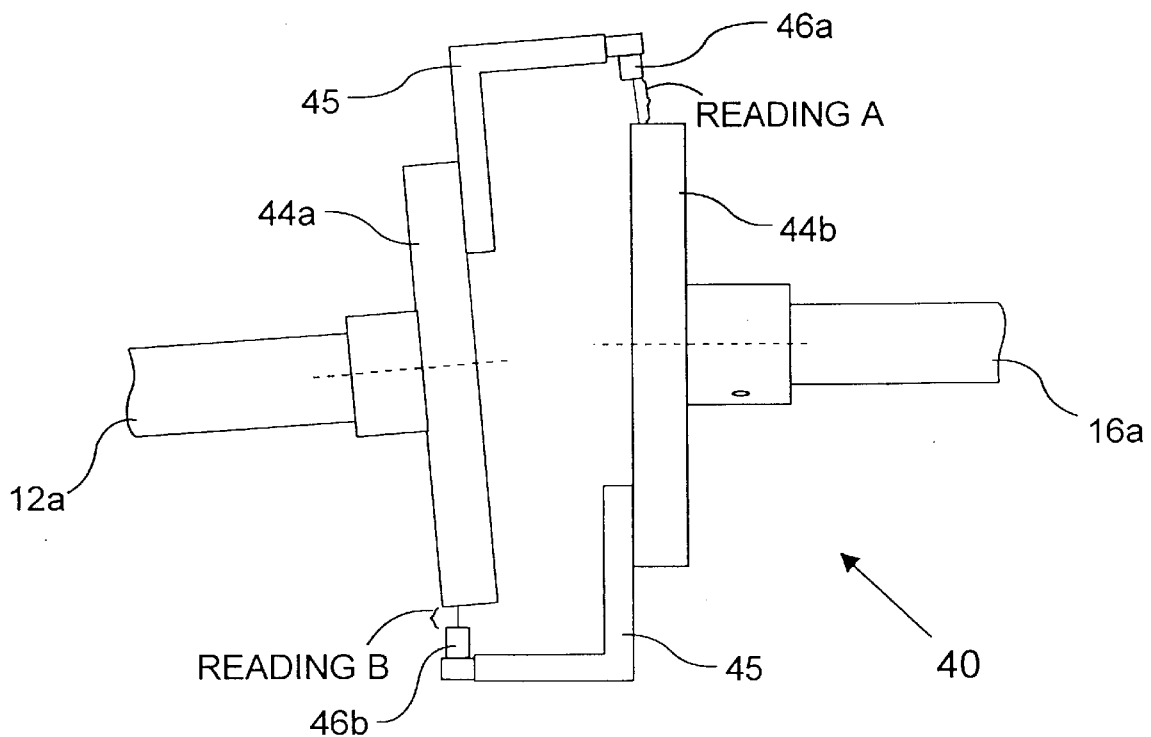
Figure 4C:
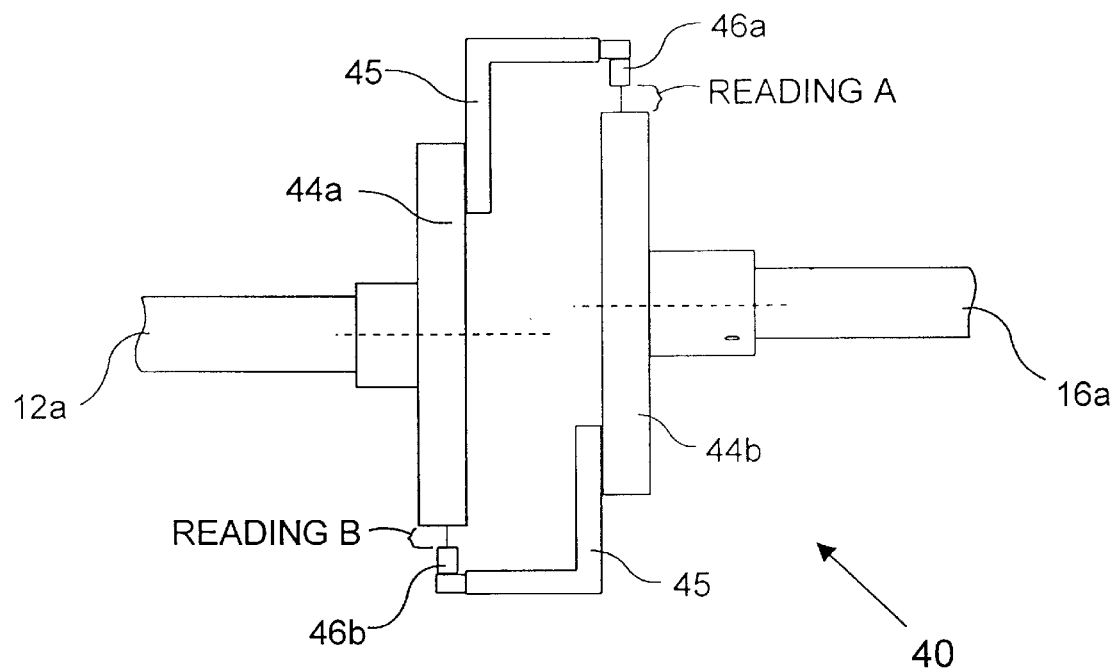

Turning now to FIGS. 4A, 4B, and 4C, there is depicted therein side views of one possible embodiment of a 'reverse alignment' type alignment fixture 40 that may be utilized with the present invention. The alignment fixture 40 may employ a plurality of precision measuring means, including precision measuring devices 46a and 46b, to support a 'reverse alignment' process (or other known processes). The precision measuring device 46a, which would typically be configured to provide electronic signals proportional to measurements or readings, is suitably supported by a first coupling hub 44a and a mounting bracket 45 in an extended position to support the well known reverse alignment measurements. Similarly, the precision measuring device 46b would be supported by a second coupling hub 44b and a mounting bracket 45 in an extended position. As can be seen in FIG. 4A, the two measurements are designated as 'reading A' and 'reading B'. To establish all required alignment information, reading A and reading B would typically be determined for effecting the required vertical adjustments, and also for effecting the required horizontal alignments. Accordingly, and as known in the art, at minimum 4 measurements at the rotational locations corresponding to 0, 90, 180, and 270 degrees would be made via the alignment fixture 40 as depicted in FIG. 4A. For completeness and clarity, a very concise and brief overview of the misalignments possible and the system activity required (of specific components) to provide the proper axial alignment will now be discussed. For simplicity, assume the portion of the alignment process being conducted is related to the vertical alignment and involves adjustments provided by the vertical actuator units 20. A dual of the discussed process, as required for proper horizontal alignment, may be inferred and applied to establish the proper horizontal alignment (as skilled artisans will appreciate).

It will be assumed that a known offset, say, of 0.500 thousandths of an inch is required to position the vertical actuator units 20 as shown in FIG. 1. Accordingly, a preset offset of plus, or possibly minus, 0.500 thousandths of an inch may be applied to the measurements provided by precision measuring devices 46a and 46b. However, it must be understood, that the actual preset value or offsets utilized will be determined as a function of the actual 'offsets' required for each respective precision measuring device (and its orientation and configuration). For simplicity, it may be assumed for the purposes and scope of this example that a known and equal preset is applied to yield a reading of zero for both reading A and reading B when the shafts are properly aligned. It must be understood, however, that regardless of the preset values or offsets employed, all readings are communicated to the control and computing unit 30 of FIG. 1 or FIG. 5, as needed. If the alignment is determined to be that of FIG. 4A (i.e., proper and axial), then it will be assumed that reading A and reading B would be equal and zero, for example as displayed on a display means of the alignment system 10. Accordingly, if the alignment is as shown in FIG. 4B wherein the center-lines or axis of each shaft intersects at an angle, then reading A and reading B would be unequal, and one or both would be non-zero. Referring to FIG. 4B, the proper alignment may be established by first adjusting the angle of the first shaft 12a with respect to the second shaft 16a, which may result in a parallel offset of the center-line or axis of each shaft, 12a and 16a, respectively. The adjustment of the angle of the shafts may involve the actuation of one or more vertical actuator units 20. This adjustment, to produce and angle of zero degrees between the center-lines or axes of the first shaft 12a and the second shaft 16a, may result in a parallel offset between said shafts. A parallel offset displacement, as shown in FIG. 4C, may be determined to exist, in the current example, by the reading A and reading B being equal but not zero. For example, a positive (and equal) reading for both reading A and reading B, may be eliminated by actuating each vertical actuator unit 20 to lower (or raise) each location about the mounting means 22, as required by specific embodiments of the alignment system 10 or 10a of the present invention. Again, the above reverse alignment process would then be employed to alter the horizontal position to provide for, for example, a resulting reading A and reading B that are also 'zero'. As skilled persons will appreciate (and as partially discussed above), many known arrangements of the alignment fixture 40, and associated alignment process, may be employed with the present invention to gather alignment information. Further, the present invention may include an alignment fixture (means) that may support the alignment of 'coupled' or 'uncoupled' shafts.

A well known concern in the art, is the proper tightening of bolts, nuts, or the securing means, which are often employed to secure the first unit 12 in a properly aligned position. That is, if the tightening sequence of, and or the torque applied to, for example, motor feet bolts, in not correct, a soft foot condition may result, possibly causing an improper alignment of the first unit 12. Therefore, to further automate (and possibly improve) the alignment systems 10 and 10a of the present invention, a means may be provided to support the tightening and loosening of bolts, nuts, etc., under the control of the control and computing unit. For example, power driven ratchets and appropriate sensors (not illustrated) may be included and operatively coupled to the control and computing unit, to provide for a specific tightening sequence, at a specified torque, of motor feet bolts, and the like. Skilled individuals will appreciate the advantage to this additional feature, and may provide various embodiments thereof.

Figure 5:
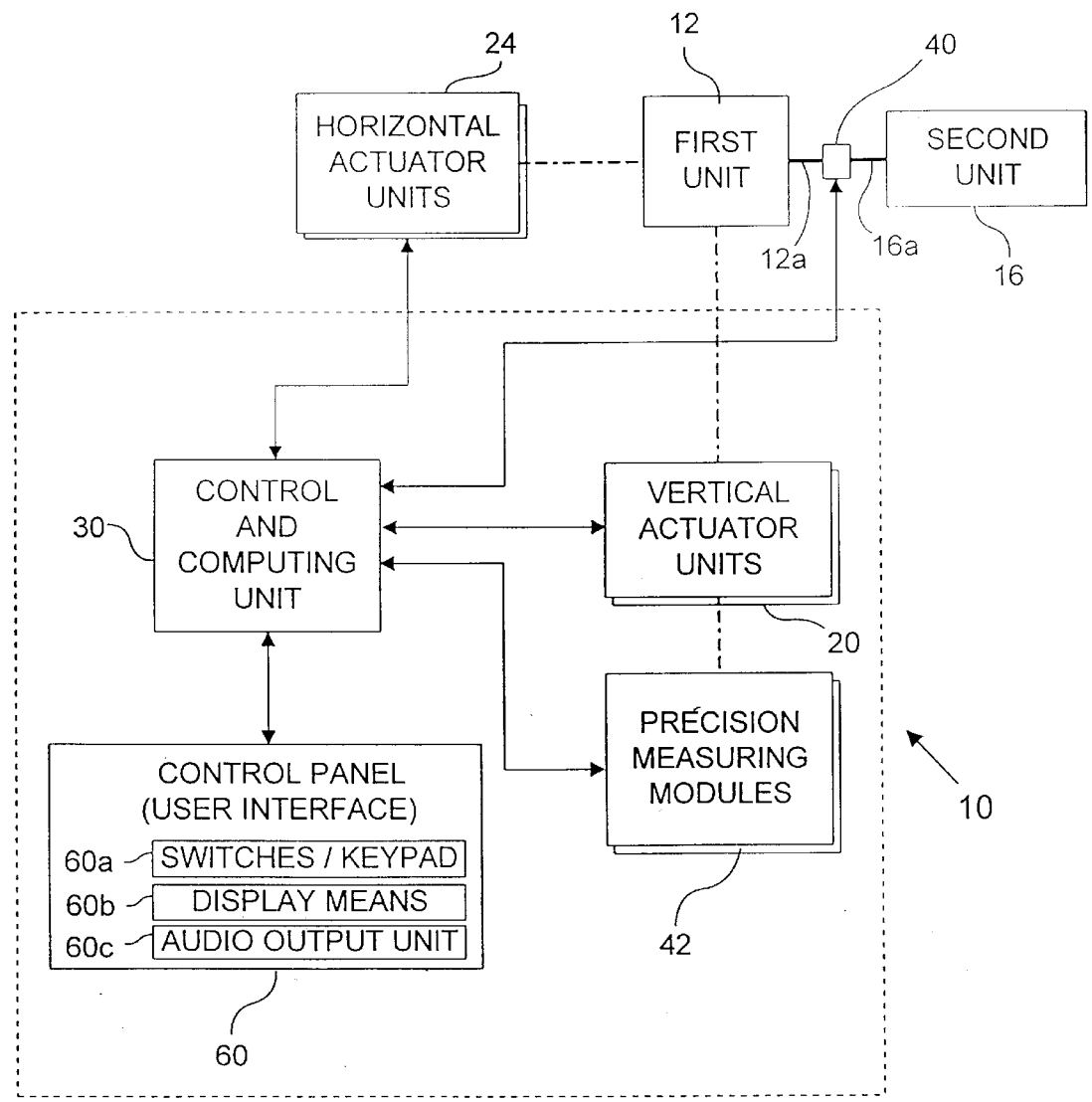
FIG. 5 provides a high level functional block diagram of a preferred embodiment of the apparatus of the present invention.

Referring now to FIG. 5, there is provided a high level functional block diagram of a preferred embodiment of the alignment apparatus 10 or 10a of the present invention. As discussed above, the control and computing unit 30 is shown and operatively (e.g., electronically) coupled to various components and units including the plurality of vertical actuator units 20, the plurality of horizontal actuator units 24, the plurality of precision measuring modules 42, and the alignment fixture 40. Further, as shown in FIG. 5, a control panel 60 (or user interface) may be comprised of a switch means, for example switches/keypad 60a, to support user configuration and user command input, display means 60b to at minimum display reading A and reading B (possibly simultaneously displaying both vertical and horizontal measurement/alignment information), and an audio output unit 60c to provide information to the user. Essentially, the control panel enables the exchange of information between the user and the control and computing unit 30, as required to support the operation of the alignment system 10.

It should be understood that the control and computing unit 30, possibly also including the control panel 60, may be provided by an industrial general purpose personal computer, or PC. Alternately, the control and computing unit 30 may be provided by programmable and or hardwired computing devices, for example, including one or more microcontrollers, hardwired/fixed logic, field programmable gate array (FPGAs) devices, and or industrial programmable logic controllers (PLCs), all of which are well known to skilled persons. In addition, those skilled in the art will appreciate the control and computing unit 30 may employ one or more known alignment methods, algorithms and or calculations, as required, to enable an operator to establish the desired axial alignment of the first shaft 12a and the second shaft 16a.

Skilled persons will recognize there is a need with an alignment system of the present invention to operatively couple the various components and units to the control and computing unit 30, and that for clarity the operative couplings have been omitted from all but FIG. 5. Further, the need to supply power to energize many of the components or devices shown in FIGS. 1 through 5 would most certainly be required. Again, for simplicity, and so as to not obfuscate the basic components and functional blocks, and their operation, the required power source connections have been omitted. Further, a regulation unit or circuit (not shown) may be included to regulate and filter a suitable power source, especially in a noisy industrial environment. Many suitable operative coupling and power supplying arrangements, and their possible configurations, are well known in the art.

It is must be understood that the architectural and operational embodiments described herein are exemplary of a plurality possible to provide the same (or equivalent) general system operation and features. Therefore, while there have been described the currently preferred embodiments of the present invention, those skilled in the art will recognize that other and further modifications may be made without departing from the present invention, and it is intended to claim all modifications and variations as fall within the scope of the invention.

What is claimed is:

1. An alignment system to axially align a first shaft with a second shaft, the first shaft rotatably mounted and extending outwardly from a first unit and toward the second shaft, and the second shaft rotatably mounted and extending outwardly from a second unit toward the first shaft, the alignment system comprising:

(a) a control and computing unit;

(b) a plurality of vertical actuator units, responsive to the control and computing unit, each vertical actuator unit positionable at a suitable location about a footprint established by mounting means of the first unit, each vertical actuator unit arranged to enable the adjustment of the vertical position of an associated location;

(c) a plurality of horizontal actuator units, responsive to the control and computing unit, configured to enable the horizontal adjustment of the position of the first unit with respect to the second unit;

(d) a plurality of precision measuring modules, each operatively coupled to a respective vertical actuator unit to accurately determine a change in the vertical position as the vertical position is adjusted at the associated location, the change being communicated to the control and computing unit; and (e) alignment information determining means to provide alignment information to the control and computing unit, the alignment information useful for determining the appropriate respective vertical position adjustments required by each of the vertical actuator units and the appropriate respective horizontal position adjustments required by each of the horizontal actuator units;

(f) wherein the application of the vertical position adjustments and the horizontal position adjustments results in the required vertical and horizontal alignment changes needed to properly axially align the first shaft with respect to the second shaft.

2. The alignment system according to claim 1, wherein each vertical actuator unit includes a screw-type actuator element driven by an electric motor.

3. The alignment system according to claim 2, wherein the screw-type actuator element is suitably mechanically coupled to the electric motor via a gear deduction arrangement, thereby improving the control and adjustability of the vertical actuator units.

4. The alignment system according to claim 3, wherein each vertical actuator unit includes a lifting portion having a low-clearance requirement for easy positioning under the mounting means of the first unit.

5. The alignment system according to claim 1, wherein the horizontal actuator units are provided screw-type electric powered actuator elements.

6. The alignment system according to claim 1, wherein the control and computing unit includes a user interface having a display unit to provide at least one alignment reading to an operator.

7. The alignment system according to claim 6, wherein the display unit provides at least two alignment readings, which may be monitored by an operator to verify changes in at least one of the horizontal position and the vertical position of the first shaft with respect to the second shaft.

8. The alignment system according to claim 7, wherein the user interface further includes a plurality of switch means to enable the operator to manually adjust the vertical and horizontal position of the first unit.

9. The alignment system according to claim 7, wherein alignment information is comprised of vertical alignment information employed to determine the adjustments required in the vertical position and horizontal alignment information employed to determine the adjustments required in the horizontal position.

10. The alignment system according to claim 9, wherein at least a portion of the alignment information is ascertained by the synchronous rotation of both the first and second shafts from a first rotational position to a second rotational position having at an angular displacement of 180 degrees with respect to the first rotational position.

11. The alignment system according to claim 1, wherein the alignment system is arranged to be portable and easily installed and operated to achieve the proper shaft alignment, and subsequently uninstalled and removed for subsequent use.

12. A precision shaft alignment system for establishing the proper axial alignment of a first rotatably mounted shaft that extends from a first unit, and a second opposed, rotatably mounted shaft that extends from a second unit, the alignment achieved by adjusting the relative horizontal and vertical position of the first unit with respect to the second unit to precisely axially align the shaft of the first unit with the shaft of a second unit, the alignment system comprising:

(a) a control and computing unit for receiving alignment information indicative of vertical and horizontal position changes required to align the first and second shafts;

(b) a plurality of vertical actuator units, each positionable at a suitable location about a mounting plate of the first unit to enable the altering of the vertical position and alignment of the first shaft with respect to the second shaft, each vertical actuator unit responsive to the control and computing unit;

(c) a plurality of horizontal actuator units, each arranged to enable the altering of the horizontal position and alignment of the first unit with respect to the second unit in order to establish the required horizontal alignment, each horizontal actuator unit responsive to the control and computing unit; and (d) an alignment fixture including a plurality of precision measuring devices arranged to support a reverse alignment process to determine alignment information that is communicated to the control and computing unit, the alignment information useful for determining the appropriate respective vertical position adjustments required by the vertical actuator units and the appropriate respective horizontal position adjustments required by the horizontal actuator units.

13. The alignment system according to claim 12 further including a plurality of precision measuring modules, each operatively coupled to a respective vertical actuator unit to determine a change in the vertical position as the vertical position is adjusted at the associated footprint location, the change being communicated to the control and computing unit, as determined, to maintain simultaneous harmony of the vertical actuators when raising and lowering the first unit by compensating for any movement variance detected by momentarily stopping one or more vertical actuators.

14. The alignment system according to claim 12, wherein the alignment fixture is comprised of two spaced assemblies, each assembly including a coupling hub concentricity mounted on the proximal end of each shaft and suitably supporting at least one precision measuring device in a position overhanging the circumference of the other shaft's coupling hub to enable a reverse alignment process to produce alignment information.

15. The alignment system according to claim 14, wherein alignment information is comprised of vertical alignment information employed to determine adjustments required in the vertical position, and horizontal alignment information employed to determine adjustments required in the horizontal position.

16. The alignment system according to claim 15, wherein the alignment information is ascertained by the synchronous rotation of both the first and second shafts from a first rotational position to a second rotational position oriented at an angular displacement of 180 degrees with respect to the first rotational position, wherein the change in the readings provided by the rotation from the first rotational position to the second rotational position by at least one of the precision measuring devices produces alignment information.

* * * * *